(12) United States Patent
Fujii et al.

(10) Patent No.: US 10,133,155 B2
(45) Date of Patent: Nov. 20, 2018

(54) IMAGING DEVICE

(71) Applicant: SONY CORPORATION, Tokyo (JP)

(72) Inventors: Kentaro Fujii, Tokyo (JP); Toshihide Kanazawa, Kanagawa (JP); Hikaru Tanoue, Kanagawa (JP); Takaya Konishi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/305,495

(22) PCT Filed: Feb. 18, 2015

(86) PCT No.: PCT/JP2015/054375
§ 371 (c)(1),
(2) Date: Oct. 20, 2016

(87) PCT Pub. No.: WO2015/166688
PCT Pub. Date: Nov. 5, 2015

(65) Prior Publication Data
US 2017/0045802 A1    Feb. 16, 2017

(30) Foreign Application Priority Data

May 1, 2014  (JP) ................. 2014-094591
May 2, 2014  (JP) ................. 2014-095521

(51) Int. Cl.
*G03B 13/02*    (2006.01)
*G03B 13/00*    (2006.01)
(Continued)

(52) U.S. Cl.
CPC ............. *G03B 13/02* (2013.01); *G03B 13/00* (2013.01); *G03B 13/06* (2013.01); *G03B 17/04* (2013.01); *H04N 5/225* (2013.01); *H04N 5/2252* (2013.01)

(58) Field of Classification Search
CPC ...... G03B 17/561; G03B 13/02; G03B 13/06; G03B 13/00; G03B 17/04; H04N 5/23293;
(Continued)

(56) References Cited

U.S. PATENT DOCUMENTS 5,701,535 A    12/1997  Reibl
9,307,135 B2*   4/2016  Noh ..................... G03B 13/02
(Continued)

FOREIGN PATENT DOCUMENTS

JP    60-121431 A    6/1985
JP    63-140778 U    9/1988
(Continued)

OTHER PUBLICATIONS

Extended European Search Report of EP Patent Application No. 15785620.4, dated Aug. 11, 2017, 08 pages.

*Primary Examiner* — Trung Diep
*Assistant Examiner* — Gevell Selby
(74) *Attorney, Agent, or Firm* — Chip Law Group

(57) ABSTRACT

There is provided an imaging device that includes a body and a viewfinder. The viewfinder is movable in two or more directions, between an encased position and a operative position. The viewfinder is encased inside the body at the encased position. The viewfinder is projected outside the body at the operative position.

17 Claims, 14 Drawing Sheets

(51) Int. Cl.
*G03B 17/04* (2006.01)
*H04N 5/225* (2006.01)
*G03B 13/06* (2006.01)

(58) Field of Classification Search
CPC .... H04N 5/2252; H04N 5/225; G02B 27/017; G06F 3/147; G09G 2340/0492; A47C 7/70
See application file for complete search history.

(56) References Cited

U.S. PATENT DOCUMENTS

2002/0158812 A1* 10/2002 Pallakoff ............... G06F 1/1616
 345/1.1
2014/0300791 A1* 10/2014 Shirono ............. H04N 5/23293
 348/333.06

FOREIGN PATENT DOCUMENTS

| | | |
|---|---|---|
| JP | 05-107621 A | 4/1993 |
| JP | 05-244474 A | 9/1993 |
| JP | 07-148115 A | 6/1995 |
| JP | 2001-268402 A | 9/2001 |
| JP | 2002-374432 A | 12/2002 |
| JP | 2003-143445 A | 5/2003 |
| JP | 2004-266613 A | 9/2004 |
| JP | 2010-109454 A | 5/2010 |
| JP | 2013-138376 A | 7/2013 |
| JP | 2014-204280 A | 10/2014 |

* cited by examiner

[FIG. 1]
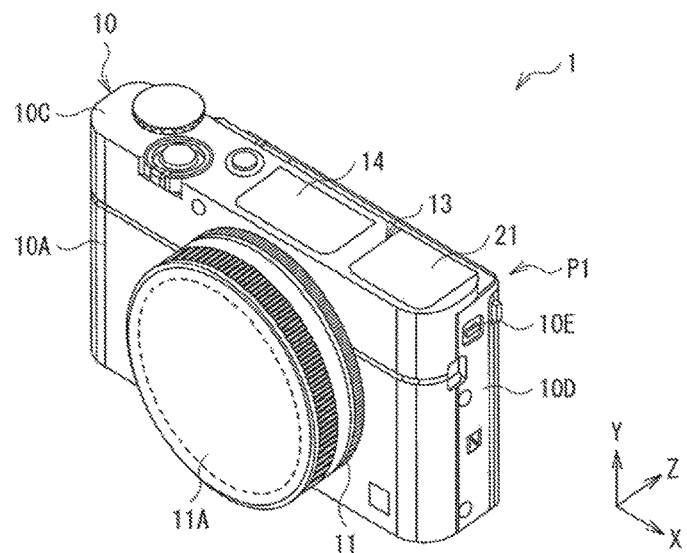
[FIG. 2]
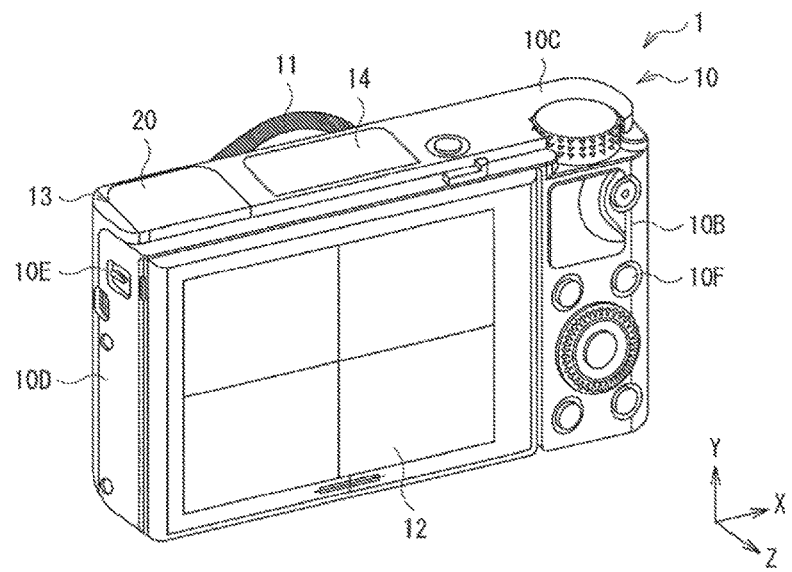

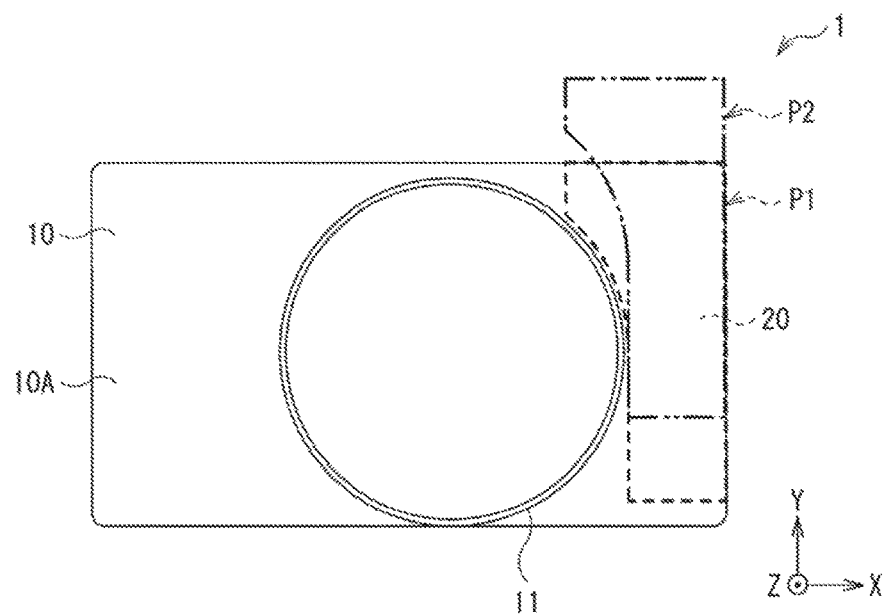
[FIG. 3]

[FIG. 4]
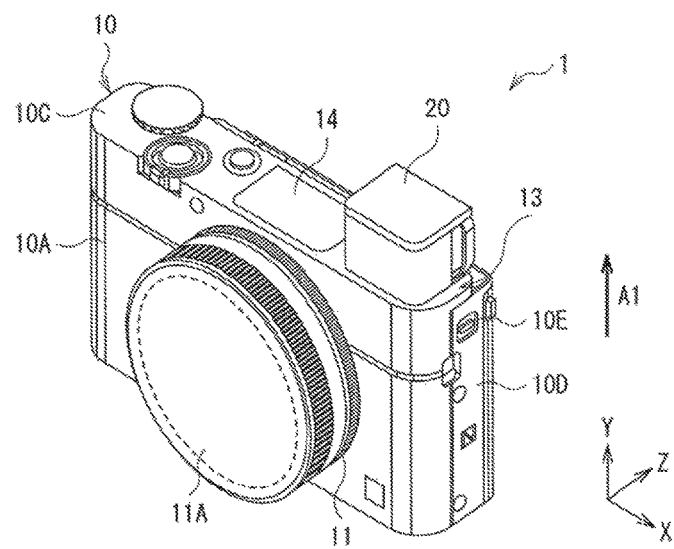
[FIG. 5]
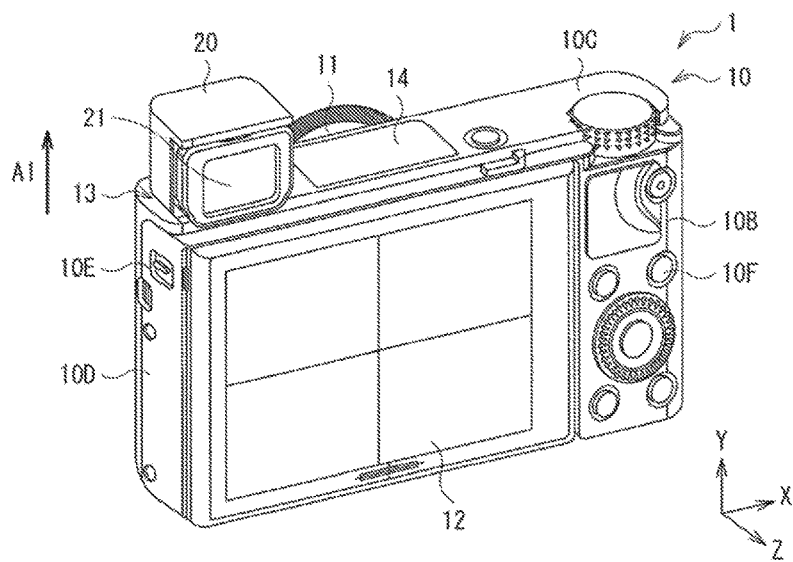

[FIG. 6]
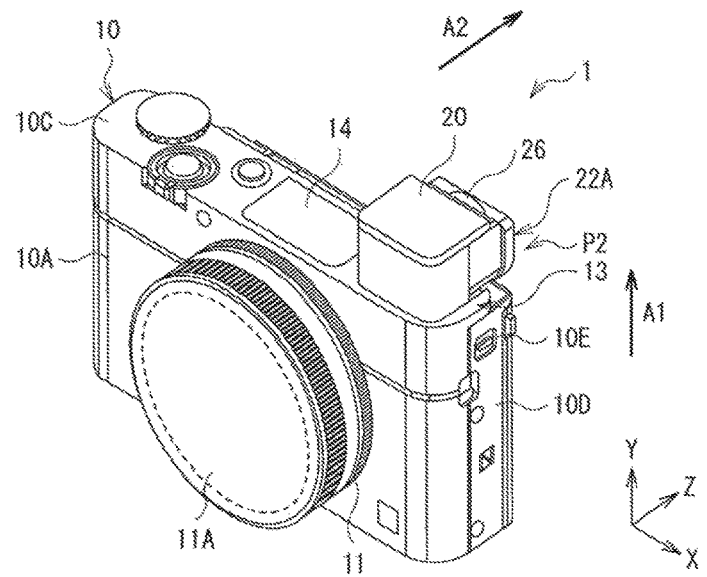
[FIG. 7]
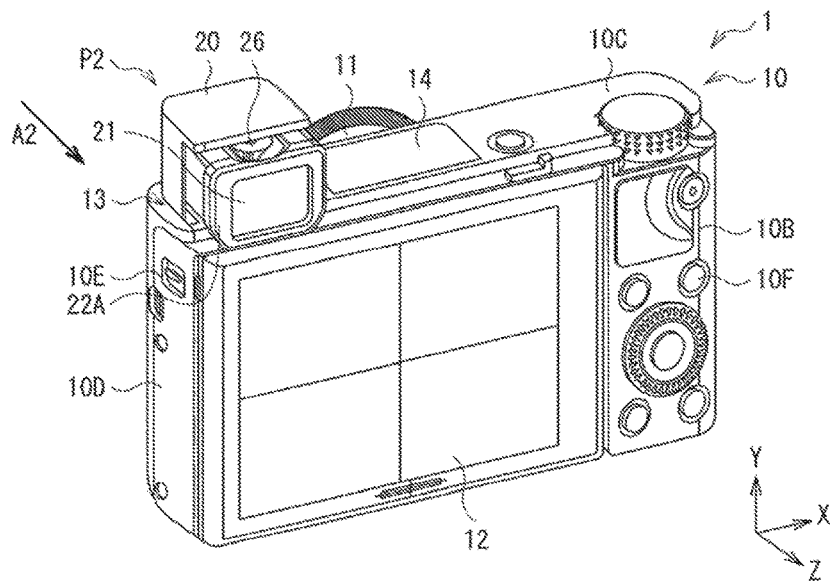

[FIG. 8]
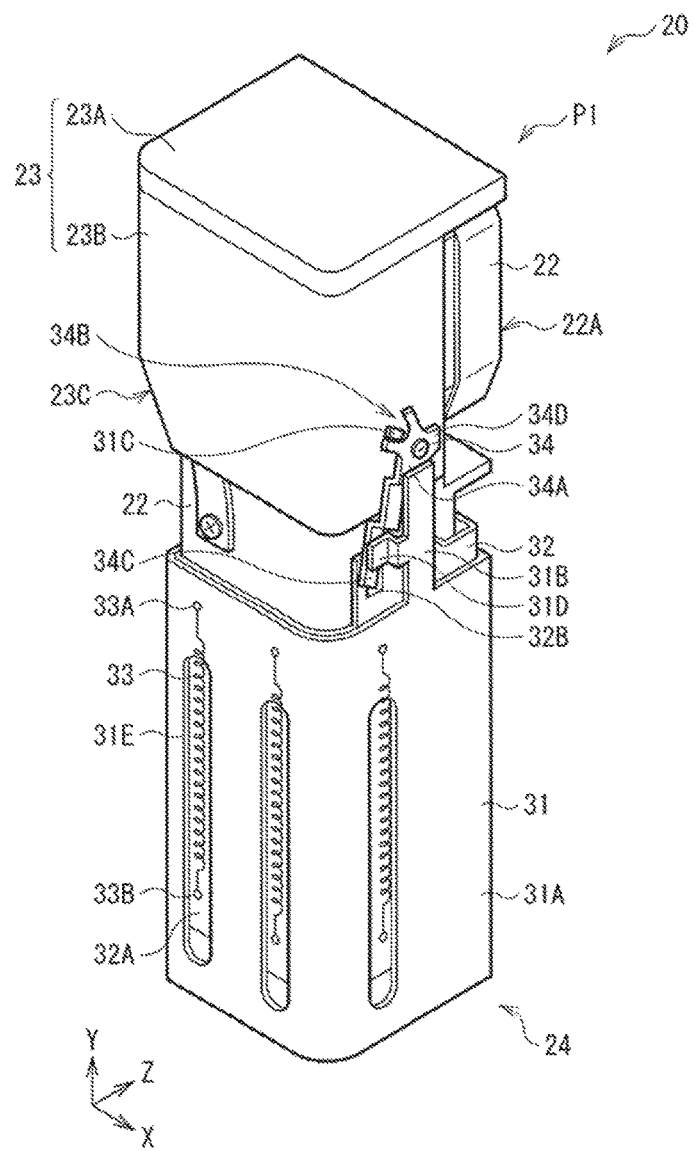

[FIG. 9]
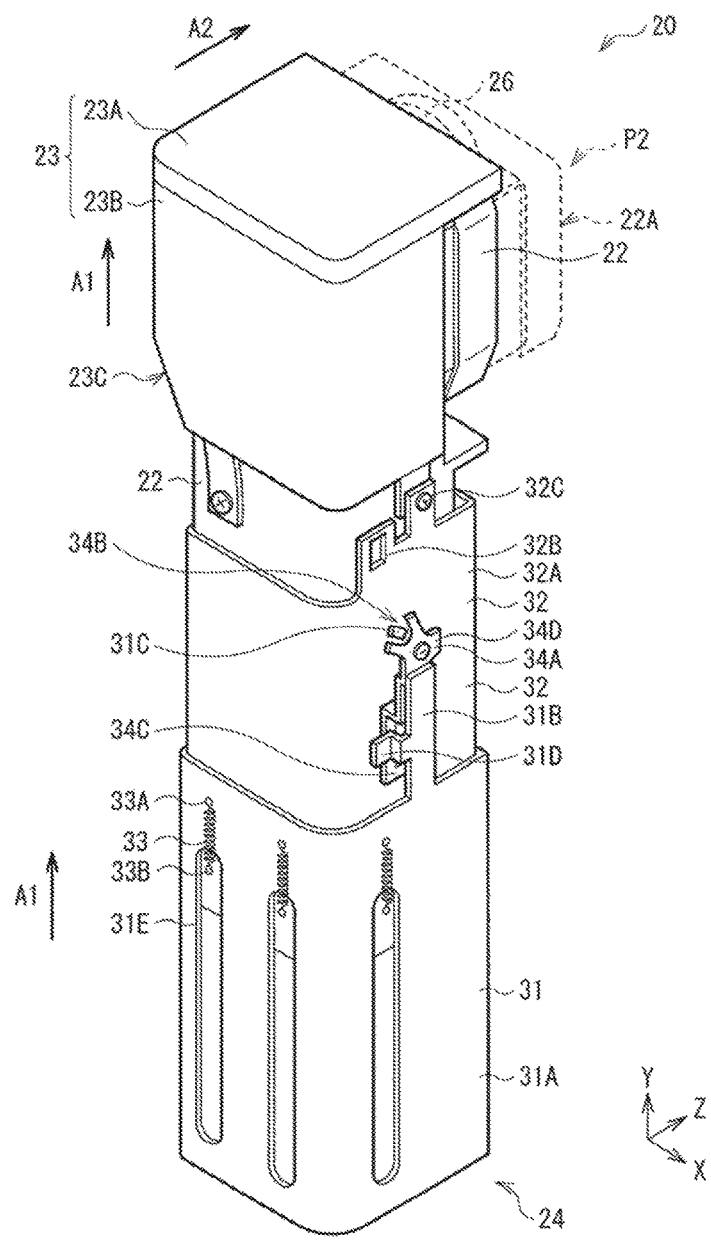

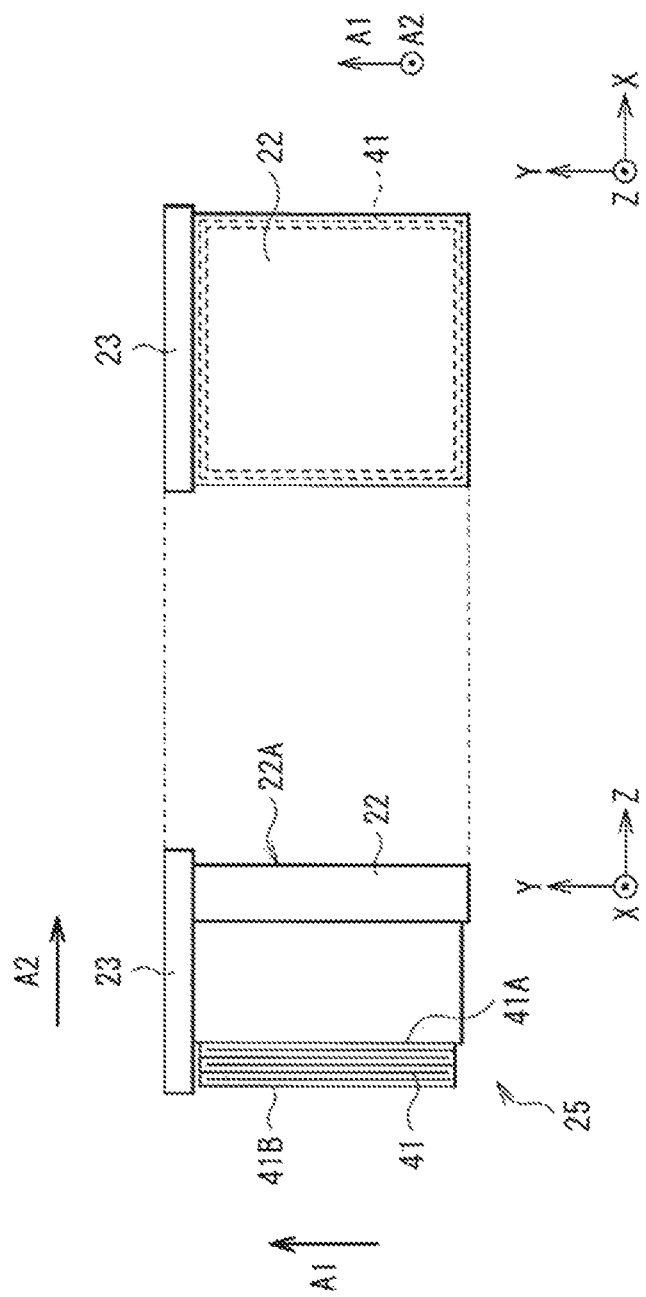

[ FIG. 11 ]
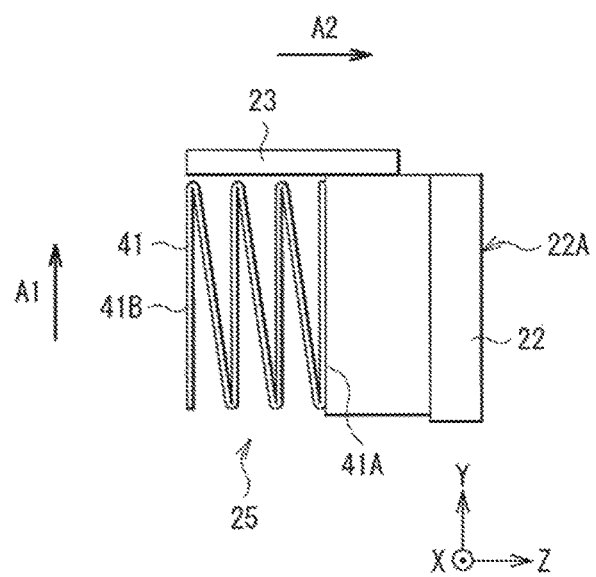

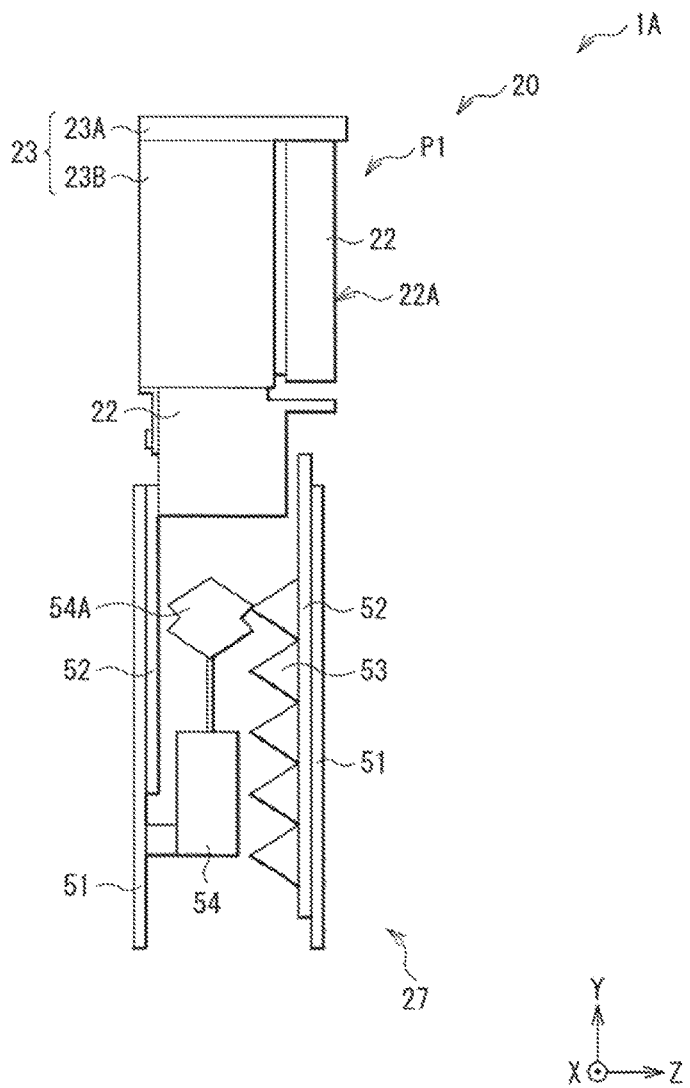
[ FIG. 12 ]

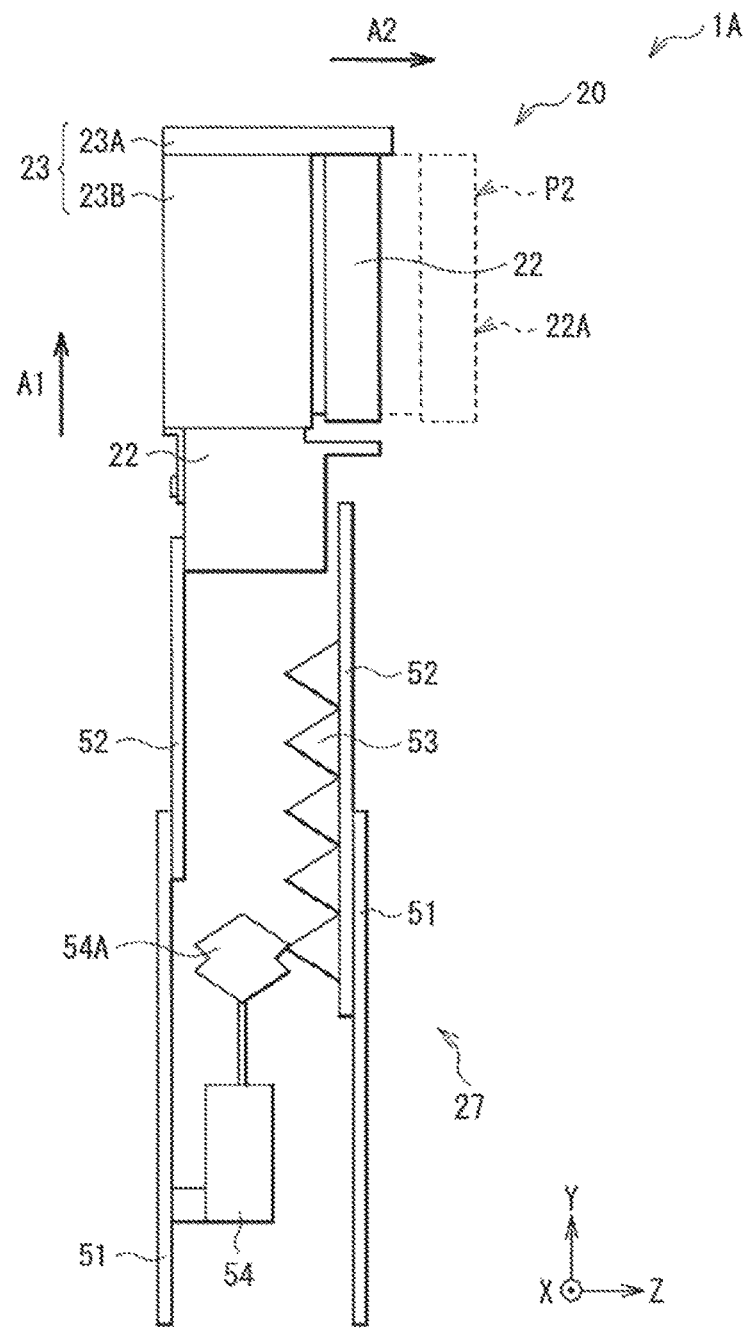
[FIG. 13]

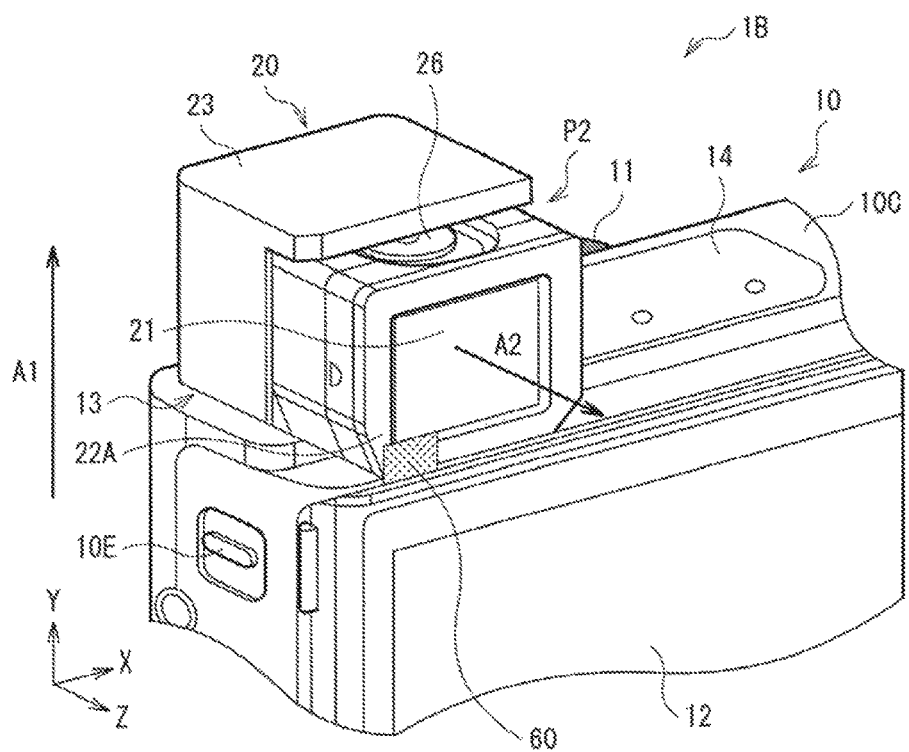
[FIG. 14]

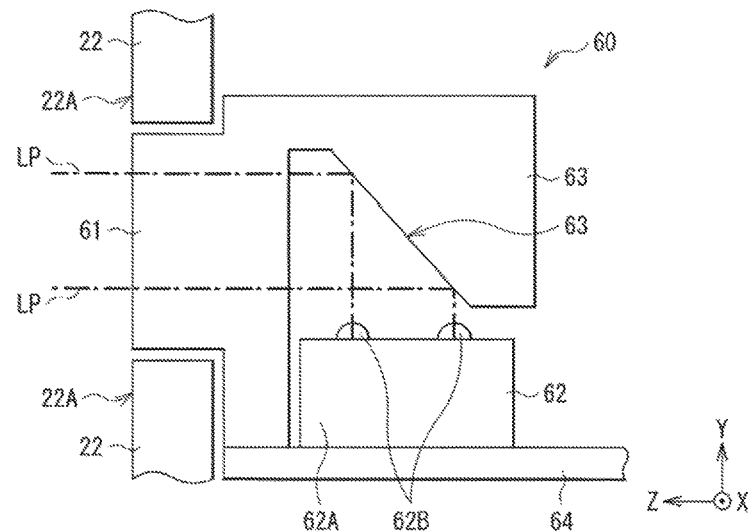
[ FIG. 15 ]
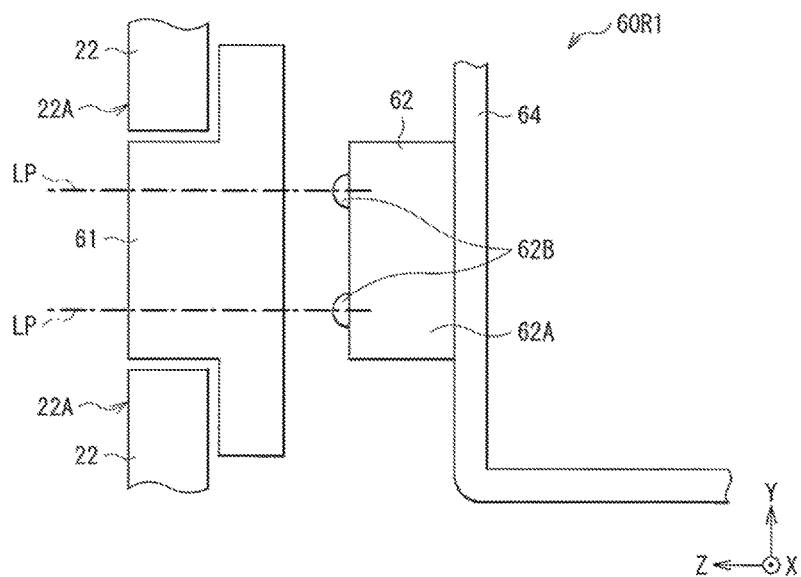
[ FIG. 16 ]

[ FIG. 17 ]
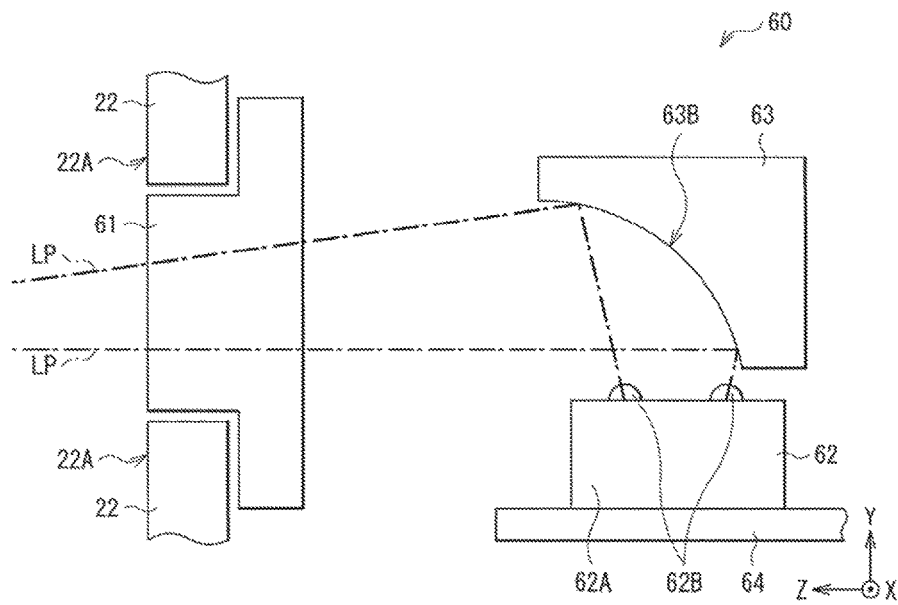
[ FIG. 18 ]
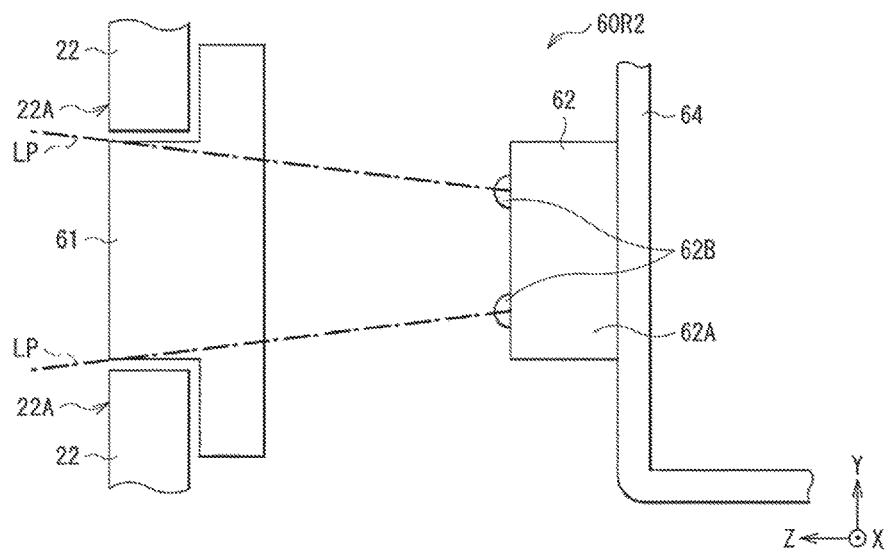

[ FIG. 19 ]
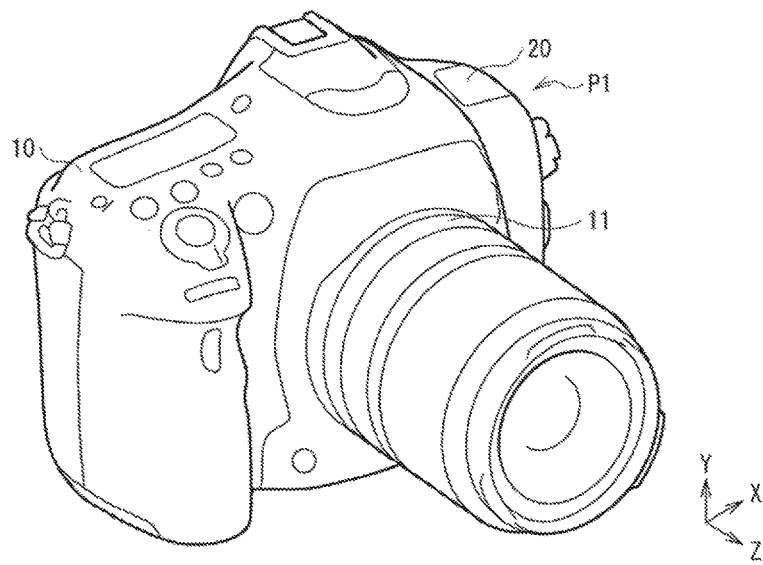
[ FIG. 20 ]
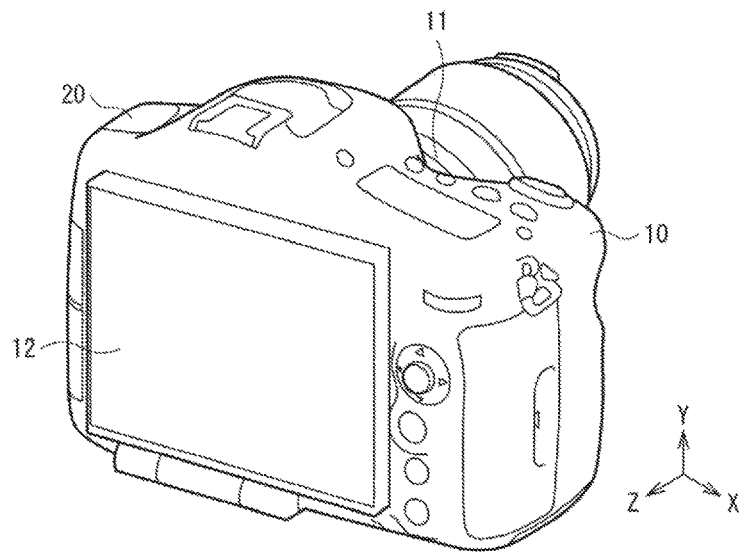

IMAGING DEVICE

CROSS REFERENCE TO RELATED APPLICATIONS

This application is a U.S. National Phase of International Patent Application No. PCT/JP2015/054375 filed on Feb. 18, 2015, which claims priority benefit of Japanese Patent Application No. JP 2014-094591 filed in the Japan Patent Office on May 1, 2014 and also claims priority benefit of Japanese Patent Application No. JP 2014-095521 filed in the Japan Patent Office on May 2, 2014. Each of the above-referenced applications is hereby incorporated herein by reference in its entirety.

TECHNICAL FIELD

The disclosure relates to an imaging device suitable for a camera such as a compact digital still camera (DSC).

BACKGROUND ART

Proposals have been made for imaging devices including a viewfinder that may be folded along a body, or a viewfinder that may be retracted into a body, in consideration of downsizing for portability (for example, refer to Patent Literature 1 or 2). Users may draw the viewfinder out toward themselves for use.

CITATION LIST

Patent Literature

Patent Literature 1: JP 1985-121431A
Patent Literature 2: JP 2001-268402A

SUMMARY OF INVENTION

In order to draw the viewfinder out toward themselves for use, it is desirable that an opening through which the viewfinder is drawn out of or retracted into the body be located so as not to interfere with a lens barrel or a display on a back surface of the body. However, an increase in a diameter of the lens barrel and an increase in a screen size of the display have caused difficulty in arrangement of the viewfinder, and constituted an obstruction to downsizing of the body.

It is therefore desirable to provide an imaging device that allows for downsizing.

An imaging device according to an embodiment of the disclosure includes a body and a viewfinder. The viewfinder is movable in two or more directions, between an encased position and an operative position. The viewfinder is encased inside the body at the encased position. The viewfinder is projected outside the body at the operative position.

In the imaging device according to the embodiment of the disclosure, the viewfinder is movable in two or more directions, between the encased position and the operative position. The viewfinder is encased inside the body at the encased position. The viewfinder is projected outside the body at the operative position. This allows an opening through which the viewfinder moves into or out of the body to be located in other than a back surface of the body, which leads to easy adaptation to an increase in a diameter of the lens barrel and an increase in a screen size of the display.

According to the imaging device of the embodiment of the disclosure, the viewfinder is movable in two or more directions, between the encased position and the operative position. The viewfinder is encased inside the body at the encased position. The viewfinder is projected outside the body at the operative position. Hence, it is possible to attain downsizing.

It is to be noted that some effects described here are not necessarily limitative, and any of other effects described herein may be achieved.

BRIEF DESCRIPTION OF DRAWINGS

FIG. 1 is a perspective view of a configuration of an imaging device according to a first embodiment of the disclosure, as seen from lens side.

FIG. 2 is a perspective view of the configuration of the imaging device illustrated in FIG. 1, as seen from display side.

FIG. 3 is a front view that illustrates arrangement of a viewfinder inside a body at an encased position illustrated in FIG. 1.

FIG. 4 is a perspective view of the imaging device illustrated in FIG. 1, with the viewfinder projected upward of the body from the encased position.

FIG. 5 is a perspective view of the configuration of the imaging device illustrated in FIG. 4, as seen from the display side.

FIG. 6 is a perspective view of the imaging device illustrated in FIG. 4, with the viewfinder advanced rearward of the body to an operative position.

FIG. 7 is a perspective view of the configuration of the imaging device illustrated in FIG. 6, as seen from the display side.

FIG. 8 is a perspective view of a configuration of the viewfinder illustrated in FIG. 3, as in the encased position.

FIG. 9 is a perspective view of the configuration of the viewfinder illustrated in FIG. 8, as in the operative position.

FIG. 10 is a front view and a side view of a configuration of a viewfinder unit illustrated in FIG. 8, as in the encased position.

FIG. 11 is a side view of the configuration of the viewfinder unit illustrated in FIG. 8, as in the operative position.

FIG. 12 is a schematic side view of a configuration of a viewfinder of an imaging device according to a second embodiment of the disclosure, as in an encased position.

FIG. 13 is a schematic side view of the configuration of the viewfinder illustrated in FIG. 12, as in an operative position.

FIG. 14 is a perspective view that illustrates a position of an eye sensor in an imaging device according to a third embodiment of the disclosure.

FIG. 15 is a cross-sectional view of a configuration of the eye sensor illustrated in FIG. 14.

FIG. 16 is a cross-sectional view of a configuration of an eye sensor according to a reference example 1.

FIG. 17 is a cross-sectional view of a modification example of a reflecting member illustrated in FIG. 15.

FIG. 18 is a cross-sectional view of a configuration of an eye sensor according to a reference example 2.

FIG. 19 is a perspective view of an imaging device according to a modification example 1, as seen from lens side.

FIG. 20 is a perspective view of the imaging device illustrated in FIG. 19, as seen from display side.

DESCRIPTION OF EMBODIMENTS

In the following, some embodiments of the disclosure are described in detail with reference to the drawings.

1. First Embodiment (a compact digital single-lens reflex camera; an example with a first movement mechanism and a second movement mechanism, in which both the first movement mechanism and the second movement mechanism are mechanical movement mechanisms)
2. Second Embodiment (an example in which, in the first embodiment, the first movement mechanism is an electrical movement mechanism)
3. Third Embodiment (an eye sensor configuration; an example with a reflecting member provided in an optical path between a sensor window and a sensor unit)
4. Modification Example 1 (an example of application to a digital single-lens reflex camera)

First Embodiment

FIG. 1 illustrates a configuration of an imaging device according to a first embodiment of the disclosure, as seen from front. FIG. 2 illustrates the configuration of the imaging device as seen from rear. The imaging device 1 may be a compact digital single-lens reflex camera, and includes a body 10 and a viewfinder 20, for example. Referring to FIG. 3, the viewfinder 20 is encased inside the body 10 at an encased position P1 when not in use, and projected outside the body 10 at an operative position P2 when in use.

Herein, a term "front" denotes lens-side or object-side in a front-rear direction Z of the body 10, whereas a term "rear" denotes display-side or image-side. It is to be noted that the front-rear direction Z is the same as a direction of an optical axis of a lens (undepicted) that may be coupled to the body 10. A left-right direction is denoted as an X direction. Reference to right and left is made as seen from the rear of the body 10. An up-down direction of the body 10 is denoted as a Y direction.

The body 10 may be shaped of, for example, a rectangular parallelepiped. A body-side mount 11 may be provided on a front surface 10A. An imaging element and an image processor (neither depicted) may be incorporated inside. A display 12 may be provided on a back surface 10B of the body 10.

The body-side mount 11 may perform mechanical or electrical coupling between the body 10 and an interchangeable lens (undepicted). A user may select a lens and couple the selected lens to the body 10, in accordance with applications. It is to be noted that FIG. 1 depicts the body-side mount 11 capped with a cap 11A. The imaging element may allow an object image to be formed on a light-receiving surface through the lens, and generate an electrical signal by photoelectric conversion. The imaging element may include, for example, a CMOS (Complementary Metal Oxide Semiconductor) image sensor. The image processor may perform image processing, on the basis of the electrical signal obtained by the imaging element or instructions from the user, and thereby generate image data.

The display 12 may display an image captured by the lens (undepicted), and include a liquid crystal panel, for example.

The viewfinder 20 is provided for visual checking of the captured image, so as to allow for work such as setting of a composition and focusing, and may include an OVF (optical viewfinder) or an EVF (electronic viewfinder). In a case of the electronic viewfinder, the viewfinder 20 may include an ocular lens (undepicted) and a display screen (undepicted) such as liquid crystal and organic EL (Electro Luminescence), behind an observation window 21 (undepicted in FIGS. 1 to 3, refer to FIG. 7).

Moreover, the viewfinder 20 is movable in two or more directions, between the encased position P1 and the operative position P2. The viewfinder 20 is encased inside the body 10 at the encased position P1. The viewfinder 20 is projected outside the body 10 at the operative position P2. Hence, in the imaging device 1, it is possible to attain downsizing.

In one preferred example, the viewfinder 20 may be movable in two directions that are orthogonal to each other. In one specific and preferred example, the viewfinder 20 may be extended upward of the body 10, as denoted by an arrow A1 in FIGS. 4 and 5, from the encased position P1 (refer to FIGS. 1 to 3), and thereafter advanced rearward of the body 10 (in a direction toward an eye), as denoted by an arrow A2 in FIGS. 6 and 7, to reach the operative position P2. Extending the viewfinder 20 upward of the body 10 allows the operative position P2 to be located above the body 10. This allows for a configuration close to that of a normal digital single-lens reflex camera in which the viewfinder 20 is located above a lens barrel and the display 12. It is therefore possible to enhance usability for the user. Also, advancing the viewfinder 20 rearward of the body 10 allows for reduction in a clearance between the viewfinder 20 and the eye. It is therefore possible to enhance light-blocking properties.

In one preferred example, the viewfinder 20 may be advanced rearward of the body 10 by an amount which allows an ocular surface 22A of the viewfinder 20 to be projected rearward of a back surface 10B (the display 12) of the body 10. This makes it possible to reduce the clearance between the viewfinder 20 and the eye, and to reduce possibility that a nose of the user may come into contact with the display 12. It is therefore possible to enhance usability.

In one preferred example, the body 10 may have an opening 13 in an upper surface 10C. The opening 13 may allow the viewfinder 20 to move into or out of the body 10. This makes it possible to allow the opening 21 through which the viewfinder 20 moves into or out of the body 10 to be located in other than the back surface 10B of the body 10. This leads to easy adaptation to an increase in a diameter of the lens barrel and an increase in a screen size of the display 12. It is to be noted that, in a case in which the opening 13 is located in the back surface 10B of the body 10, a size of the body 10 may be increased. Alternatively, with the size of the body 10 kept unchanged, the lens barrel may become smaller, resulting in lower magnification, lower brightness, and a smaller size of the imaging element. Also, a size of the display 12 may become smaller as well.

It is to be noted that a position of the opening 13 as illustrated in FIGS. 1 to 3 may be a position of a stroboscope in the normal digital single-lens reflex camera. In this embodiment, an arrangement of a stroboscope 14 may be changed. The stroboscope 14 may be disposed at a more central position than the opening 13.

In one preferred example, the viewfinder 20 may be arranged to avoid overlap with the body-side mount 11, as illustrated in FIG. 3 as mentioned above. This makes it possible to avoid interference between the viewfinder 20 and the lens barrel. It is to be noted that the viewfinder 20 may overlap with the display 12 in a rear view.

FIG. 8 illustrates a configuration of the viewfinder 20 illustrated in FIG. 3, as taken out from the body 10 and as in the encased position P1. FIG. 9 illustrates the configuration of the viewfinder 20 illustrated in FIG. 8, as in the operative position P2.

The viewfinder 20 may include, for example, a viewfinder unit 22, a decorative member 23, a first movement mechanism 24, a second movement mechanism 25 (refer to FIGS. 10 and 11), and a diopter adjuster 26 (refer to FIGS. 6, 7, and 9).

The viewfinder unit 22 may be a part that may be exposed outside the body 10 as in the operative position P2. The viewfinder unit 22 may include the observation window 21 as mentioned above (refer to FIGS. 5 and 7), and an ocular lens and a display screen (neither illustrated) provided behind the observation window 21.

The decorative member 23 may cover side surfaces and a back surface of the viewfinder unit 22, except for the observation window 21, and may improve an appearance of the viewfinder 20 and the imaging device 1. The decorative member 23 may include, for example, an upper-surface decorative member 23A and a side-surface decorative member 23B. The upper-surface decorative member 23A may constitute a part of an exterior member of the upper surface 10C of the body 10, when the viewfinder 20 is at the encased position P1. The side-surface decorative member 23B may cover the side surfaces and the back surface of the viewfinder unit 22, when the viewfinder 20 is at the operative position P2.

In one preferred example, the side-surface decorative member 23B may have a notch 23C that may be arranged to avoid the overlap with the body-side mount 11. This makes it possible to allow the viewfinder 20 to be arranged to avoid the overlap with the body-side mount 11, as illustrated in FIG. 3.

The first movement mechanism 24 may lift the viewfinder unit 22 upward of the body 10, and may include a mechanical movement mechanism. In one specific example, the first movement mechanism 24 may include a base frame 31, a sliding frame 32, a first resilient member 33, and an engagement mechanism 34. The base frame 31 and a sliding frame 32 may constitute a double tubular structure in which the sliding frame 32 may be inserted through the base frame 31. It is to be noted that the base frame 31 and the sliding frame 32 may have a hollow inside in which a battery of the stroboscope 14 may be accommodated.

The base frame 31 may include, for example, a base frame body 31A, a projecting tab 31B, a turning regulator 31C, and a retainer 31D. The base frame body 31A may be made of, for example, a metal plate. The base frame body 31A may be fixed to, for example, the body 10. Moreover, one end 33A of the first resilient member 33 may be fixed to the base frame body 31A. Furthermore, the base frame body 31A may have a slot 31E that may define a range of movement of another end 33B of the first resilient member 33. The projecting tab 31B may hold the engagement mechanism 34, and may be formed integrally with the turning regulator 31C and the retainer 31D. The turning regulator 31C may regulate a range of turning of the engagement mechanism 34, and may be provided in a guide groove 34B of the engagement mechanism 34. The retainer 31D may restrain a hook 34C of the engagement mechanism 34 from coming off from a hole 32B of the sliding frame 32.

The sliding frame 32 may include a sliding frame body 32A, and have the hole 32B. The sliding frame body 32A may be made of, for example, a metal plate. The sliding frame body 32A may be fixed, with a screw 32C (refer to FIG. 9), to the decorative member 23 that may cover the viewfinder unit 22. The hole 32B may receive the hook 34C of the engagement mechanism 34, to thereby hold the viewfinder 20 at the encased position P1.

The first resilient member 33 may be provided between the base frame 31 and the sliding frame 32, and energize the sliding frame 32 upward. In one preferred example, the first resilient member 33 may include a spring. There is no particular limitation on kinds of the spring. Preferred examples may include a tensile coil spring and a torsion coil spring. The one end 33A of the first resilient member 33 may be fixed to the base frame body 31A of the base frame 31, whereas the other end 33B of the first resilient member 33 may be fixed to the sliding frame body 32A of the sliding frame 32.

The engagement mechanism 34 may regulate upward movement of the sliding frame 32. The engagement mechanism 34 may include, for example, an attachment 34A, the guide groove 34B, the hook 34C, and a receiver 34D. The attachment 34A may be rotatably attached to the projecting tab 31B of the base frame 31. The guide groove 34B may regulate the range of turning of the engagement mechanism 34. The turning regulator 31C of the base frame 31 may be provided in the guide groove 34B. The hook 34C may be extended downward from one place of the attachment 34A. Engagement of the hook 34C with the hole 32B of the sliding frame 32 may allow the viewfinder 20 to be held at the encased position P1. The receiver 34D may be a part that may hold a viewfinder operation part (button) 10E provided in a side surface 10D of the body 10. When not in use, the viewfinder operation part 10E may be held by the receiver 34D. This may regulate the turning of the attachment 34A, keeping the hook 34C engaged with the hole 32B of the sliding frame 32. When in use, the user may slide the viewfinder operation part 10E, causing the viewfinder operation part 10E to come off from the receiver 34D. This may cause the turning of the attachment 34A, allowing the hook 34C to come off from the hole 32B of the sliding frame 32.

The second movement mechanism 25 may allow the viewfinder unit 22 to advance rearward of the body 10. The second movement mechanism 25 may include, for example, a mechanical movement mechanism. In one specific example, the second movement mechanism 25 may include a second resilient member 41, as illustrated in FIGS. 10 and 11. The second resilient member 41 may be provided between the viewfinder unit 22 and the decorative member 23, and energize the viewfinder unit 22 rearward (in the Z direction). In one preferred example, the second resilient member 41 may include a spring. There is no particular limitation on kinds of the spring. Preferred examples may include a deformed compression spring. One end 41A of the second resilient member 41 may be fixed to a back surface of the viewfinder unit 22, whereas another end 41B of the second resilient member 41 may be fixed to the decorative member 23. In one preferred example, when not in use, the viewfinder unit 22 may be retained by the back surface 10B of the body 10, and restrained from being moved by energizing force of the second resilient member 41.

It is to be noted that, in one possible alternative, the second movement mechanism 25, i.e., the second resilient member 41 may be eliminated, and the user may manually draw the viewfinder unit 22 out rearward.

The diopter adjuster 26 may be an operation part (such as a lever, a knob, and a dial) provided for adjustment of power of the viewfinder 20 in accordance with eyesight of the user. In one preferred example, the diopter adjuster 26 may be provided in an upper surface of the viewfinder unit 22 of the viewfinder 20. Moreover, in one preferred example, the diopter adjuster 26 may be concealed, by the upper-surface decorative member 23A of the decorative member 23, inside the body 10 at the encased position P1 (refer to FIGS. 1 to 3). In one preferred example, the diopter adjuster 26 may be exposed from the upper-surface decorative member 23A of the decorative member 23, and become operable at the operative position P2 (refer to FIGS. 6 and 7). Such limited accessibility to the diopter adjuster 26 makes it possible to keep the diopter adjuster 26 from being unintentionally operated and changed in settings. Moreover, an amount of projection of the diopter adjuster 26 from the upper surface of the viewfinder unit 22 may become small. This reduces possibility that returning of the viewfinder 20 from the operative position P2 to the encased position P1 may cause resetting of the settings. It is therefore possible to eliminate complicated work of re-adjustment of the diopter adjuster 26 in each use, leading to enhanced usability for the user.

Operation of the imaging device 1 may be, for example, as follows.

When not in use, the viewfinder 20 may be encased inside the body 10 at the encased position P1 (refer to FIGS. 1 to 3). At this occasion, the viewfinder operation part 10E may be held by the receiver 34D of the engagement mechanism 34. This allows for regulation of the turning of the attachment 34A of the engagement mechanism 34, keeping the hook 34C of the engagement mechanism 34 engaged with the hole 32B of the sliding frame 32 (refer to FIG. 8).

When in use, the user may slide the viewfinder operation part 10E provided in the side surface 10D of the body 10. Thus, the viewfinder operation part 10E may come off from the receiver 34D of the engagement mechanism 34. This may cause the turning of the attachment 34A, allowing the hook 34C of the engagement mechanism 34 to come off from the hole 32B of the sliding frame 32 (refer to FIG. 9). As a result, energizing force of the first resilient member 33 may cause the sliding frame 32 to move upward of the body 10, allowing the viewfinder unit 22 to pop up outside the body 10 (refer to FIGS. 4 and 5).

At the encased position P1, the movement of the viewfinder unit 22 by the energizing force of the second resilient member 41 may be restrained by the back surface 10B of the exterior member of the body 10 (refer to FIG. 10). When the viewfinder unit 22 moves out of the body 10, however, the energizing force of the second resilient member 41 may cause the viewfinder unit 22 to advance rearward of the body 10, and to reach the operative position P2 (refer to FIG. 11).

Moreover, at the operative position P2, the diopter adjuster 26 may be exposed from the upper-surface decorative member 23A of the decorative member 23 and become operable. Thus, the viewfinder 20 may become operative.

As described, in this embodiment, the viewfinder 20 is movable in two or more directions, between the encased position P1 and the operative position P2. The viewfinder 20 is encased inside the body 10 at the encased position P1. The viewfinder 20 is projected outside the body 10 at the operative position P2. This allows the opening 13 through which the viewfinder 20 moves into or out of the body 10 to be located in other than the back surface 10B of the body 10. Hence, it is possible to downsize the body 10, as well as adaptation to the increase in the diameter of the lens barrel and the increase in the screen size of the display 12.

Second Embodiment

In the forgoing first embodiment, description is given on a case in which the first movement mechanism 24 may cause the viewfinder 20 to be extended upward of the body 10, and the first movement mechanism 24 may be the mechanical movement mechanism. However, as illustrated in FIGS. 12 and 13, the first movement mechanism 24 may be an electrical movement mechanism 27.

The viewfinder 20 in this embodiment may include, for example, the viewfinder unit 22 and the electrical movement mechanism 27. The electrical movement mechanism 27 may lift the viewfinder unit 22 upward of the body 10, and may include, for example, a base frame 51, a sliding frame 52, a rack 53, and a motor 54. The base frame 51 and the sliding frame 52 may constitute a double tubular structure in which the sliding frame 52 may be inserted through the base frame 51. It is to be noted that the base frame 51 and the sliding frame 52 may have a hollow inside in which the battery of the stroboscope 14 may be accommodated. The rack 53 may be provided on the sliding frame 52. The motor 54 may be fixed to the base frame 51, and include a worm gear 54A that may engage the rack 53.

In this imaging device 1A, when not in use, the viewfinder 20 may be encased inside the body 10 at the encased position P1 (refer to FIGS. 1 to 3). When in use, the user may operate the viewfinder operation part 10F provided in the back surface 10B of the body 10 (refer to FIGS. 1, 5, and 7; one alternative may be a touch panel of the display 12). This may cause rotation of the motor 54, allowing for sliding of the rack 53 (refer to FIG. 13), because of engagement of the worm gear 54A and the rack 53. Thus, the sliding frame 32 may be moved upward of the body 10, allowing the viewfinder unit 22 to pop up outside the body 10 (refer to FIGS. 4 and 5). The sliding frame 52 and the viewfinder unit 22 that has ascended may be kept at the pop-up position by self-locking of the worm gear 54A, without providing a specific holder mechanism.

At the encased position P1, the movement of the viewfinder unit 22 by the energizing force of the second resilient member 41 may be restrained by the back surface 10B of the exterior member of the body 10 (refer to FIG. 10). When the viewfinder unit 22 moves out of the body 10, however, the energizing force of the second resilient member 41 may cause the viewfinder unit 22 to advance rearward of the body 10, and to reach the operative position P2 (refer to FIG. 11).

Moreover, at the operative position P2, the diopter adjuster 26 may be exposed from the upper-surface decorative member 23A of the decorative member 23 and become operable. Thus, the viewfinder 20 may become operative.

Third Embodiment

FIG. 14 illustrates, in an enlarged manner, a part of an imaging device 1B according to a third embodiment of the disclosure. In particular, FIG. 14 illustrates the viewfinder 20 at the operative position P2. The imaging device 1B according to this embodiment may have similar configurations, workings, and effects to those of the imaging device 1 according to the forgoing first embodiment, except that the viewfinder 20 may include an eye sensor 60. Description is therefore given with corresponding components denoted by same references.

The body 10 and the viewfinder 20 may have, for example, similar configurations to those of the forgoing first embodiment.

FIG. 15 illustrates a cross-sectional configuration of the eye sensor 60. The eye sensor 60 may detect the eye of the user that approaches the viewfinder 20, and perform switching between display on the display 12 and display on the viewfinder 20. The eye sensor 60 may include, for example, a sensor window 61, a sensor unit 62, and a reflecting member 63. The sensor unit 62 may be disposed perpendicularly to the sensor window 61. The reflecting member 63 may be provided in an optical path LP between the sensor window 61 and the sensor unit 62. Hence, in the imaging device 1B, it is possible to attain downsizing.

The sensor window 61 may be provided in, for example, the ocular surface 22A of the viewfinder 20 (for example, a region around the observation window 21, e.g., left downward in FIG. 14). Providing the viewfinder 20 with the eye sensor 60 makes it possible to dispose the eye sensor 60 at a position close to the eye, leading to higher precision in detection. Moreover, at the encased positon P1, the eye sensor 60 may be concealed inside the body 10. This reduces possibility of erroneous operation.

The sensor unit 62 may include, for example, a light-receiving element 62B on a substrate 62A. The sensor unit 62 may be mounted on a holder member 64.

The reflecting member 63 may include a reflecting surface 63A that may reflect light with a mirror surface, and thereby change a path of light. The reflecting member 63 may be provided as an integral member with the sensor window 61, as illustrated in FIG. 15. Alternatively, the reflecting member 63 may be provided as a separate member from the sensor window 61.

Reference Example 1

FIG. 16 illustrates a configuration of an eye sensor 60R1 according to a reference example 1. In the reference example 1, the sensor window 61 and the sensor unit 62 may be disposed in a face-to-face arrangement. This results in an increase in a storage space in the up-down direction Y.

In contrast, in this embodiment, the sensor unit 62 may be disposed perpendicularly to the sensor window 61. The reflecting member 63 may be provided in the optical path LP between the sensor window 61 and the sensor unit 62, to change the path of the light. This makes it possible to reduce the storage space in the up-down direction Y, to provide further compactness (a decrease in a mounting volume), and to downsize the body 10.

FIG. 17 illustrates a modification example of the reflecting member 63. In one preferred example, the reflecting member 63 may include a curved reflecting surface 63B. Providing the reflecting member 63 with optical characteristics such as the curved surface makes it possible to restrain sensor characteristics from being lowered, even when a distance from the sensor window 61 to the sensor unit 62 is large.

Reference Example 2

FIG. 18 illustrates a configuration of an eye sensor 60R2 according to a reference example 2. In the reference example 2, because the distance from the sensor window 61 to the sensor unit 62 is large, light may be diffused, which may cause lower sensor characteristics.

In contrast, in a modification example as illustrated in FIG. 17, the reflecting member 63 may include the curved reflecting surface 63B. Accordingly, even when the distance from the sensor window 61 to the sensor unit 62 is large, light diffusion may be restrained, with smaller degradation in the sensor characteristics. It is therefore possible to dispose the sensor window 61 and the sensor unit 62 at a large distance, leading to enhancement in a degree of freedom in mounting.

As described, in this embodiment, the sensor unit 62 may be disposed perpendicularly to the sensor window 61. The reflecting member 63 may be provided in the optical path LP between the sensor window 61 and the sensor unit 62, to change the path of the light. Hence, it is possible to reduce the storage space in the up-down direction Y, to provide more compact mounting, and to downsize the body 10.

Furthermore, the reflecting member 63 may include the curved reflecting surface 63B. Hence, it is possible to restrain the sensor characteristics from being lowered, when the distance from the sensor window 61 to the sensor unit 62 is large.

It is to be noted that, in the forgoing third embodiment, description is given on a case in which the eye sensor 60 may be provided on the viewfinder 20. However, this embodiment may be applicable to a case in which the eye sensor 60 may be provided on the body 10.

Although description has been made by giving the example embodiments as mentioned above, the contents of the disclosure are not limited to the above-mentioned example embodiments and may be modified in a variety of ways. For example, configurations of the first movement mechanism 24, the second movement mechanism 25, and the electrical movement mechanism 27 are not limited to as exemplified in the forgoing example embodiments, but may have other configurations.

Moreover, for example, in the forgoing example embodiments, description has been given on a case in which the viewfinder 20 may be movable in the two directions, i.e., upward and rearward of the body 10. However, the viewfinder 20 may be movable in three or more directions, without being limited to the two-directional movement. Moreover, there is no particular limitation on directions or routes of the movement of the viewfinder 20. For example, in a case of vertical position photographing, the viewfinder 20 may be extended sideward (in the X direction) of the body 10, and thereafter advanced rearward (in the Z direction) of the body 10.

Furthermore, for example, in the forgoing example embodiments, description has been given on an example with a compact digital single-lens reflex camera. However, the disclosure may be applicable to a digital single-lens reflex camera, as illustrated in FIGS. 19 and 20, for example.

In addition, for example, in the forgoing example embodiments, description has been given on a case with an interchangeable lens. However, the lens may be unitized with the body 10. In this case, the body-side mount 11 on the body 10 as illustrated in FIG. 1 may be eliminated.

Furthermore, for example, in the forgoing example embodiments, description has been given on a case in which an image captured by the body 10 may be displayed on the display 40 attached to the body 10. However, a display of a smartphone (a multi-function mobile phone) or a monitor of a personal computer may be also utilized, instead of the display 40.

In addition, for example, shapes, dimensions, materials, or other properties of the components as described in the forgoing example embodiments are not limited to as exemplified above, but other shapes, dimensions, and materials may be adopted.

Furthermore, for example, in the forgoing example embodiments, description has been given on specific configurations of the imaging device 1. However, the imaging device 1 is not limited to those that include all the components as described. Also, the imaging device 1 may further include another component or other components.

It is to be noted that effects described herein are merely exemplified and not limitative, and effects of the disclosure may be other effects or may further include other effects.

The contents of the technology may have the following configurations.

(1)
An imaging device, including:
a body; and
a viewfinder that is movable in two or more directions, between an encased position and an operative position, the viewfinder being encased inside the body at the encased position, and the viewfinder being projected outside the body at the operative position.

(2)
The imaging device according to (1),
wherein the viewfinder is movable in two directions that are orthogonal to each other.

(3)
The imaging device according to (1) or (2),
wherein the viewfinder is extended upward of the body from the encased position, and advanced rearward of the body to reach the operative position.

(4)
The imaging device according to any one of (1) to (3),
wherein the body has an opening in an upper surface of the body, the opening allowing the viewfinder to move into or out of the body.

(5)
The imaging device according to (3) or (4),
wherein the viewfinder includes:
a viewfinder unit; and
a first movement mechanism that lifts the viewfinder unit upward of the body.

(6)
The imaging device according to (5),
wherein the first movement mechanism is a mechanical movement mechanism.

(7)
The imaging device according to (6),
wherein the first movement mechanism includes:
a base frame;
a sliding frame that is inserted through the base frame and coupled to the viewfinder unit;
a resilient member that is provided between the base frame and the sliding frame and energizes the sliding frame upward; and
an engagement mechanism that regulates upward movement of the sliding frame.

(8)
The imaging device according to (7),
wherein the resilient member includes a spring.

(9)
The imaging device according to (5),
wherein the first movement mechanism is an electrical movement mechanism.

(10)
The imaging device according to (9),
wherein the first movement mechanism includes:
a base frame;
a sliding frame that is inserted through the base frame and coupled to the viewfinder unit;
a rack provided on the sliding frame; and
a motor that is fixed to the base frame and includes a worm gear that engages the rack.

(11)
The imaging device according to any one of (5) to (10),
wherein the viewfinder further includes a second movement mechanism that allows the viewfinder unit to advance rearward of the body.

(12)
The imaging device according to (11),
wherein the second movement mechanism includes a resilient member.

(13)
The imaging device according to (12),
wherein the resilient member includes a spring.

(14)
The imaging device according to any one of (1) to (13),
wherein the body includes a body-side mount or a lens, on a front surface of the body,
the viewfinder is arranged to avoid overlap with the body-side mount or the lens.

(15)
The imaging device according to (14),
wherein the viewfinder includes:
a viewfinder unit;
a decorative member that covers the viewfinder unit,
the decorative member having a notch that is arranged to avoid the overlap with the body-side mount or the lens.

(16)
The imaging device according to any one of (1) to (15),
further including a diopter adjuster, wherein the diopter adjuster is provided in an upper surface of the viewfinder, is concealed inside the body at the encased position, and becomes operable at the operative position.

(17)
The imaging device according to any one of (1) to (16),
further including an eye sensor,
the eye sensor including:
a sensor window;
a sensor unit disposed perpendicularly to the sensor window; and
a reflecting member provided in an optical path between the sensor window and the sensor unit.

(18)
The imaging device according to (17),
wherein the reflecting member includes a curved surface.

This application claims the benefit of Japanese Priority Patent Application JP 2014-94591 filed on May 1, 2014 and Japanese Priority Patent Application JP 2014-95521 filed on May 2, 2014 the entire contents of each of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. An imaging device, comprising:
a body;
a viewfinder configured to:
move, in at least two directions, between an encased position and an operative position; and
move in a first plane and a second plane, wherein the first plane is orthogonal to the second plane,
wherein the viewfinder is encased inside the body at the encased position, and the viewfinder is projected outside the body at the operative position; and
a first resilient member configured to move the viewfinder in the second plane subsequent to the movement of the viewfinder in the first plane, wherein the first resilient member is at a back surface of the viewfinder, and wherein the back surface is opposite to an ocular surface of the viewfinder.

2. The imaging device according to claim 1, wherein the viewfinder is further configured to:
   extend in an upward direction of the body from the encased position; and
   extend in a rearward direction of the body to reach the operative position of the viewfinder.

3. The imaging device according to claim 1, wherein the body has an opening in an upper surface of the body, wherein the viewfinder is configured to move one of into or out of the body through the opening.

4. The imaging device according to claim 2, wherein the viewfinder includes:
   a viewfinder unit; and
   a first movement mechanism configured to lift the viewfinder unit in the upward direction of the body in the first plane.

5. The imaging device according to claim 4, wherein the first movement mechanism is a mechanical movement mechanism.

6. The imaging device according to claim 5, wherein the first movement mechanism includes:
   a base frame;
   a sliding frame inserted through the base frame, and coupled to the viewfinder unit;
   a second resilient member, between the base frame and the sliding frame, configured to move the sliding frame in the upward direction; and
   an engagement mechanism configured to regulate the movement of the sliding frame in the upward direction.

7. The imaging device according to claim 6, wherein the second resilient member includes a spring.

8. The imaging device according to claim 4, wherein the first movement mechanism is an electrical movement mechanism.

9. The imaging device according to claim 8, wherein the first movement mechanism includes:
   a base frame;
   a sliding frame inserted through the base frame, and coupled to the viewfinder unit;
   a rack on the sliding frame; and
   a motor fixed to the base frame, wherein the motor includes a worm gear, and wherein the worm gear is configured to engage the rack.

10. The imaging device according to claim 4, wherein the viewfinder further includes a second movement mechanism configured to extend the viewfinder unit in the rearward direction of the body in the second plane.

11. The imaging device according to claim 10, wherein the second movement mechanism includes the first resilient member.

12. The imaging device according to claim 11, wherein the first resilient member includes a spring.

13. The imaging device according to claim 1, wherein the body includes at least one of a body-side mount or a lens, on a front surface of the body,
   wherein the viewfinder is arranged to avoid overlap with the at least one of the body-side mount or the lens.

14. The imaging device according to claim 13, wherein the viewfinder includes:
   a viewfinder unit; and
   a decorative member that covers the viewfinder unit,
   wherein the decorative member comprises a notch that is arranged to avoid the overlap with the at least one of the body-side mount or the lens.

15. The imaging device according to claim 1, further comprising a diopter adjuster, wherein the diopter adjuster is in an upper surface of the viewfinder,
   wherein the diopter adjuster is inside the body at the encased position, and wherein the diopter adjuster is operable at the operative position.

16. The imaging device according to claim 1, further comprising an eye sensor, the eye sensor including:
   a sensor window;
   a sensor unit perpendicular to the sensor window; and
   a reflecting member in an optical path between the sensor window and the sensor unit.

17. The imaging device according to claim 16, wherein the reflecting member includes a curved surface.

* * * * *